No. 620,828. Patented Mar. 7, 1899.
H. BASTOW.
GLASS MOLDING MACHINE.
(Application filed Jan. 4, 1898.)
(No Model.) 2 Sheets—Sheet 1.
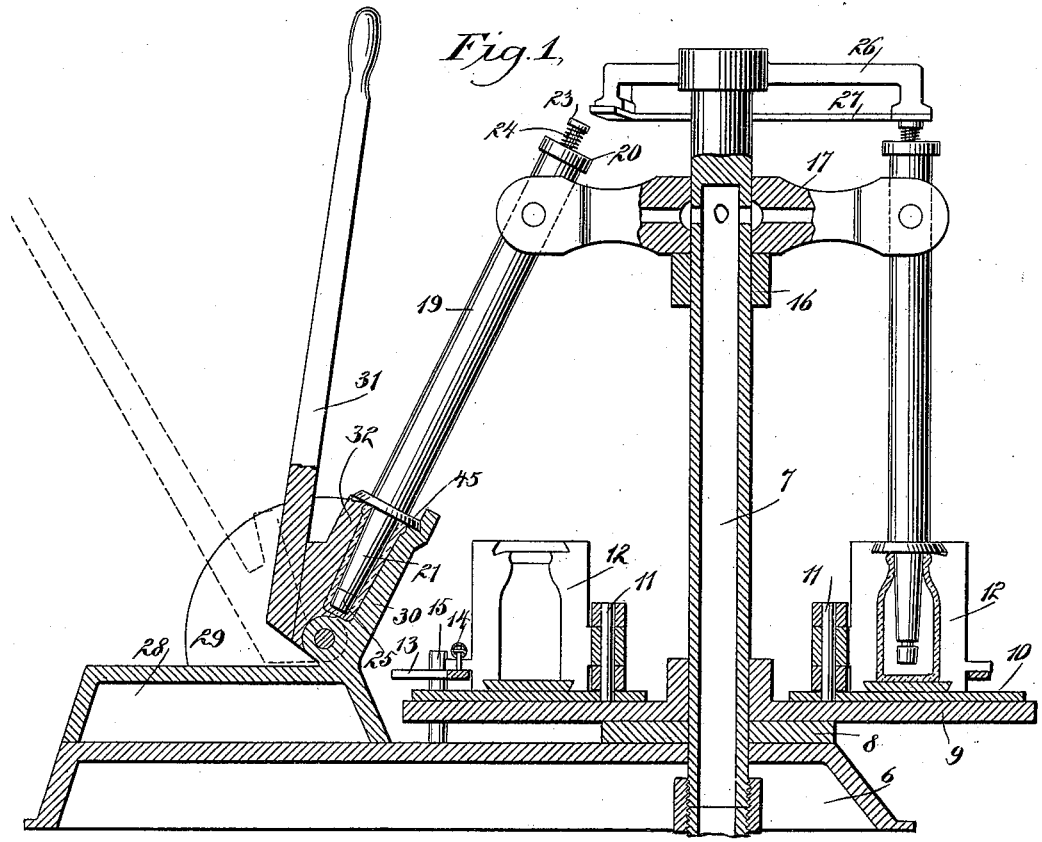
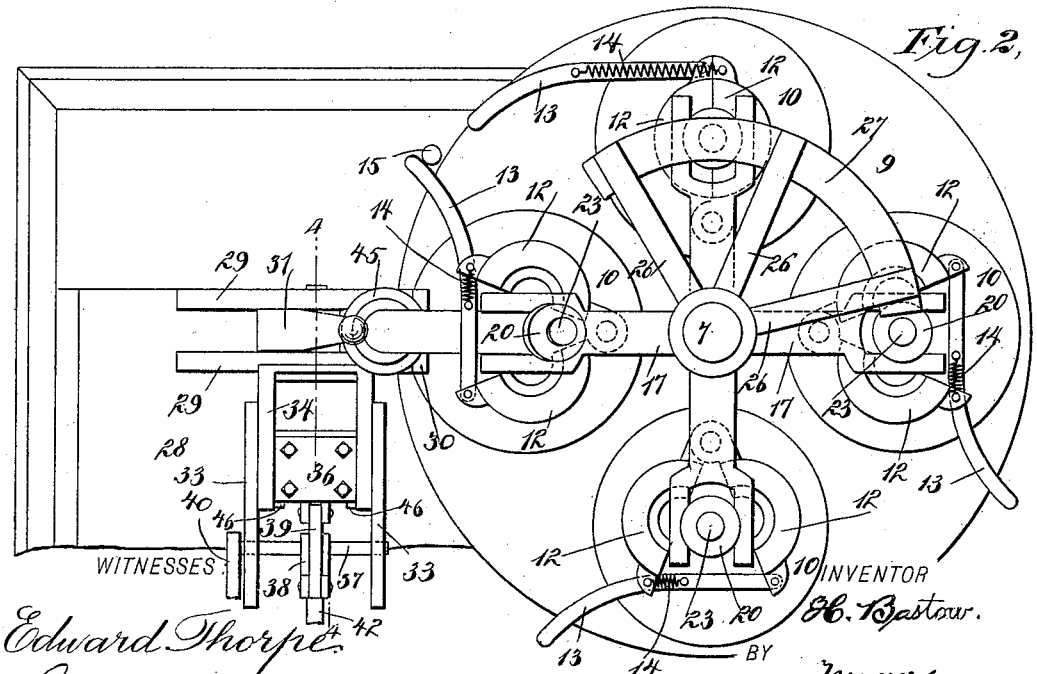
WITNESSES
Edward Thorpe
Isaac McEn[?]
INVENTOR
H. Bastow.
BY
[signature]
ATTORNEYS.

No. 620,828. Patented Mar. 7, 1899.
H. BASTOW.
GLASS MOLDING MACHINE.
(Application filed Jan. 4, 1898.)
(No Model.) 2 Sheets—Sheet 2.
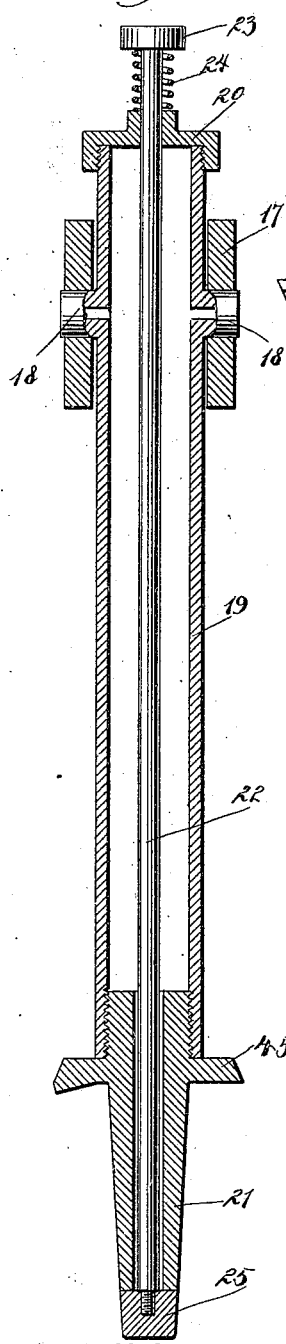
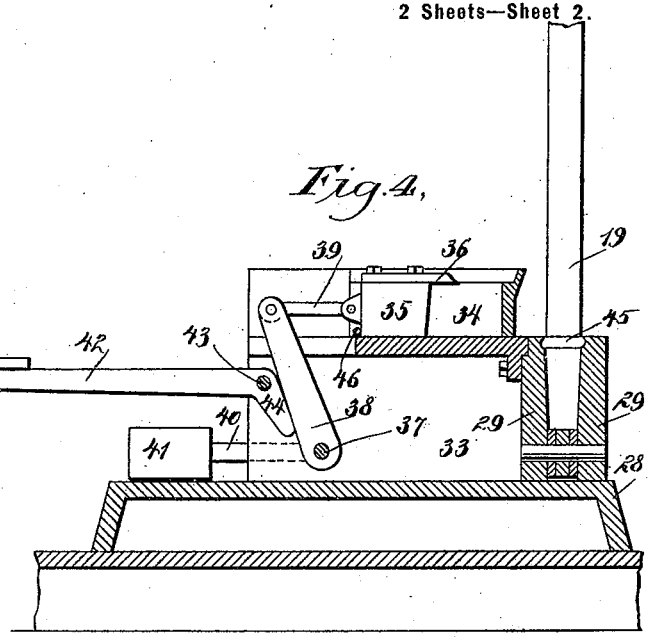
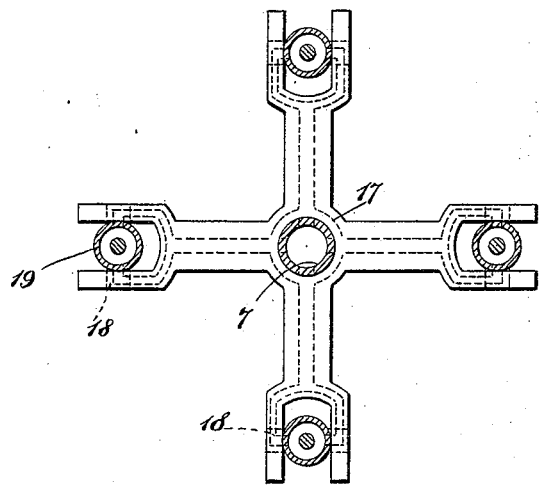
WITNESSES:
Edward Thorpe
Isaac Bruf
INVENTOR
H. Bastow
BY
ATTORNEYS.

UNITED STATES PATENT OFFICE.

HENRY BASTOW, OF INDIANA, PENNSYLVANIA.

GLASS-MOLDING MACHINE.

SPECIFICATION forming part of Letters Patent No. 620,828, dated March 7, 1899.

Application filed January 4, 1898. Serial No. 665,519. (No model.)

*To all whom it may concern:*

Be it known that I, HENRY BASTOW, of Indiana, in the county of Indiana and State of Pennsylvania, have invented a new and Improved Glass-Molding Machine, of which the following is a full, clear, and exact description.

This invention is an apparatus for molding glass jars and bottles and other articles made of glass; and it comprises means for separating the molten glass into masses sufficient to form the jars or bottles or other glass articles and in means for first pressing said mass into approximate form and for next molding or blowing the mass into exact form.

This specification is the disclosure of one form of my invention, while the claims define the actual scope of the invention.

Reference is to be had to the accompanying drawings, forming a part of this specification, in which similar characters of reference indicate corresponding parts in all the views.

Figure 1 is a vertical section of the invention. Fig. 2 is a plan view thereof. Fig. 3 is an enlarged section of the plunger. Fig. 4 is a detail section, on the line 4 4 of Fig. 2, of the means for dividing the molten glass into separate masses; and Fig. 5 is a sectional plan of the blast-column and the plunger-carrying arms which are mounted thereon.

The base 6 of the apparatus carries a column 7, which is hollow to permit the blast of air to be blown therethrough. Located on the top of the base 6 is a wear-plate 8, which supports a table 9. The table 9 turns concentrically around the column 7 and carries four molds. Each mold consists in a base-plate 10, having a rigid pin 11, to which the two mold-sections 12 are hinged. The mold-sections 12 are duplicates of each other, and their interior form, as shown in Fig. 1, is that of the vessel to be produced. One section of each mold has a curved lever 13 pivoted thereto and connected with the other section through the medium of a retractile spring 14. These levers 13, with their springs 14, serve to hold the sections 12 of the mold closed, as shown at the top of Fig. 2, or when the levers 13 are thrown manually from the positions shown at the top of Fig. 2 to the positions shown with reference to the other levers in Fig. 2 the sections 12 of the molds will be thrown open, so that the mass of glass to be molded may be placed therein or the molded article removed therefrom. The table 9 is adapted to be revolved either manually or by other power, so as to sweep past the pin 15, which is rigid with and rises from the base 6. The pin 15 is in position to engage the levers 13 when the molds are opened, and as the table 9 turns past the pin 15 the levers 13 are thrown to the position shown at the top of Fig. 2 and held in such position by their springs 14, whereby the sections of the mold are closed.

The column 7 is provided at its upper portion with a collar 16, whereon is mounted the four-armed support 17. The arms of this support are hollow and in communication with the interior of the column 7 through the medium of orifices formed in said column, as shown by full lines in Fig. 1 and dotted lines in Fig. 5. The outer end of each arm of the frame 17 is forked, and the members of said forks receive, respectively, the trunnions 18 of the plunger-tubes 19. The trunnions 18 are hollow and in communication with the interiors of the arms of the frame 17, so that the blast of air from the column 7 is transmitted through said arms and through the forks thereof into the plunger-tubes 19, which tubes 19 are four in number—one for each of the arms of the frame 17 and one for each of the molds on the table 9. Each plunger comprises one of the tubes 19, which has at its top a screw-cap 20 and at its bottom a tapering nozzle 21. Each nozzle 21 has a collar or flange 45 at its upper portion, which collars are designed to bear on the tops of the sections 12 of the molds, as will be fully described hereinafter. Movable through each plunger-tube 19 and through the cap 20 and nozzle 21 thereof is a rod or valve-stem 22, which has at its upper end a head 23, pressed upward by an expansive spring 24, and at its lower end a valve-block 25, bearing against the lower end of the nozzle 21. By pushing downward the rod or stem 22 the valve 25 is unseated from the nozzle 21 and the blast of air in the tube 19 is ejected through the nozzle 21. Carried rigidly by the upper end of the column 7 are three arms 26, which support a circular track 27. This track 27 is in the paths of the heads 23 of the stems 22 as said heads revolve with the frame 17. One end of the track-plate 27 is curved upward, so as to readily take the heads 23 beneath the plate, and as the frame 17 revolves with the table 9 the heads 23, and consequently the rods 22, are pressed downward, so as to unseat the valves 25 and admit the blast of air to the molds, it being understood that when the plungers are moved beneath the track-plate 27 they are placed with their nozzles 21 within the respective molds, so as to blow the mass of glass into the proper form, as indicated in section at the left of Fig. 1.

Carried on the base 6 is a supplemental base 28, which has two parallel quadrant-shaped cheek-plates 29, the inner edges of which are provided with an end wall 30, such wall being directly contiguous to the left-hand edge of the table 9. Swinging at approximately the center point of the quadrant-shaped plates 29 is a hand-lever 31, which has rigidly attached thereto and forming a part thereof a jaw 32, which fits snugly between the cheek-plates 29 and is movable toward and from and coacts with the end wall 30. The plungers are capable of swinging outward, as shown at the left of Fig. 1, so that the nozzles 21 thereof may lie between the wall 30 and jaw 32, and the purpose of this jaw 32, with its lever 31, is to press the mass of molten glass around the nozzle, as shown at the left in Fig. 1, and cause said mass to adhere to the nozzle, so that upon the reversal of the lever 31 it may be removed from the position shown at the left in Fig. 1 and move inward toward the column 7, so as to place the mass of glass in the appropriate mold immediately preparatory to the operation of blowing said mass, which is begun as soon as the particular plunger passes under the track 27. Fixed rigidly to the supplemental base 28 and arranged transversely to the cheek-plates 29 are two guide-plates 33, between which a U-shaped carriage 34 is arranged to slide. The carriage 34 carries an independently-movable block 35, which in turn carries a knife 36, the knife being arranged at the upper face of the block 35 and projecting forwardly from said block, so as to engage the end wall of the carriage 34 to the exclusion of the block 35. Fixed to a rock-shaft 37, carried between the guide-plates 33, is an arm 38, that projects upward and is pivotally connected with a link 39, in turn pivoted to the block 35. An arm 40 is also fixed to the shaft 37 and carries a weight 41, whereby the arm 38 is normally thrown back to the position shown in Fig. 4. A foot-lever 42 is mounted loosely on a shaft 43, carried between the guide-plates 33 and provided with a toe 44, engaging with the arm 38, so that upon the depression of the outer end of the lever 42 the toe 44 will be moved upward, so as to throw the arm 38 inward and cause the block 35 to move in the carriage 34. The normal position of the parts is that shown in Fig. 4. The operation causes a mass of glass to be placed in molten condition into the carriage 34 when the parts are in such normal position. The lever 42 is now depressed, so as to move the block 35, with its knife 36, inward and cause the knife 36 to sever a portion of the molten glass, leaving said portion in the carriage 34 and between the end wall thereof and the block 35. As the inward movement of the block continues it causes the carriage 34, which has heretofore remained stationary, to move between the guide-plates 33 and to project over the plates 29. The lever 31, having been previously moved to the position shown in Fig. 1 in dotted lines, permits the mass of glass cut off by the knife 36 to drop out of the carriage 34 and into the space between the cheek-plates 29 and between the end wall 30 and the jaw 32. The carriage 34 is provided with two pins 46, which are engaged by the block 35 on its return, whereby to draw back the carriage with the block. This having been done, the carriage 34 and block 35 are returned to the normal position and the appropriate plunger is inserted in the space between the cheek-plates 29, end wall 30, and jaw 32. Next the arm-lever 31 is moved forward to the position shown by full lines in Fig. 1, and the molten glass is molded around the nozzle 21 of the said plunger. When this has been effected, the lever 31 is thrown back and the plunger is taken from its position between the cheek-plates 29 and moved inward, as before described, so that the glass attached to the plunger is inclosed within the appropriate mold. The table 9 is now started to revolve, whereupon the pin 15 is engaged by the lever 13 of the mold concerned, and as such engagement takes place the mold is closed. Immediately subsequent to this operation the plunger passes beneath the track 27 and the valve 25 is opened to subject the molten glass to the blowing operation. When the plunger passes from beneath the track 27, an attendant may throw open the lever 13 and swing the plunger out, whereupon the complete article may readily be removed. During this operation of blowing the glass the collars 45 of the active plungers bear down upon the respective molds and serve to hold the plungers in proper position relative to the molds.

While I have shown and described my invention as particularly applicable to the molding of glass jars and bottles, it is equally well applicable to the molding of various other articles made of glass—such, for instance, as blown pitchers, tumblers, water-bottles, vases, tea sets, &c.—by simply making slight changes in the mold.

Having thus described my invention, I claim as new and desire to secure by Letters Patent—

1. The combination of a turning table, a pin standing rigidly thereon, mold-sections pivoted on said pin, a lever pivoted to one of said mold-sections, a retractile spring connecting the lever and the other mold-section, and a second pin carried by a part separate from the table and adapted to be engaged by the lever.

2. The combination with a support adapted to turn, of a plunger-tube, a rod movable longitudinally through the tube, a valve carried at the lower end of the rod, and a track carried above the plunger-tube and adapted to be engaged by the rod, whereby to push the rod downward.

3. In a glass-molding machine, the combination with a support, of a pair of cheek-plates carried thereon, means in connection with said cheek-plates for pressing the molten glass, a pair of guide-plates located adjacent to the cheek-plates, a carriage movable between the guide-plates and capable of projecting over the first-named plates, a block moving in the carriage, a knife carried by the block, and means for sliding the block.

4. The combination of a base, a hollow column standing thereon, a table turning on the base concentrically to the column, molds mounted on the table, a hollow frame mounted to turn on the column and communicating with the interior thereof, a track held by the column above the frame, blow-plungers pivotally mounted on the frame and communicating with the interior thereof, and valves carried by the plungers and commanding the blow-plungers and actuated by the track as the plungers move under the same.

5. In a glass-blowing apparatus, the combination of a hollow frame, means for revolubly mounting the frame and for supplying the same with air under pressure, a track mounted above the frame, blow-plungers carried by the frame and communicating with the interior thereof, and valves carried by the plunger and commanding the plungers and actuated by the track as the plungers pass beneath the track.

6. In a glass-blowing apparatus the combination of a base, a table turned thereon, two mold-sections pivotally mounted on the table, a lever pivotally connected to one mold-section and having yielding connection with the other, and a pin carried by the base and adapted to be engaged by the lever as the lever swings with the table.

7. In a glass-molding machine the combination of a plunger, means for mounting the plunger to move in a fixed course and for supplying the plunger with air under pressure, a valve carried by the plunger and commanding the nozzle of the plunger, and a stationary track engaged by the valve to operate the valve as the plunger moves in said course.

8. In a glass-blowing machine, the combination with a base, of guide-plates mounted thereon, a carriage held to slide between the guide-plates, a block movable on the carriage and having a knife, and means connected with the block for sliding the block and for sliding the carriage through the medium of the block.

9. In a glass-molding machine, the combination with means for holding the molten glass as the blow-plunger is dipped therein, of guide-plates mounted adjacent to said means, a carriage sliding between the guide-plates and adapted to deliver the molten glass to said means, a block independently slidable on the carriage and having a knife, and means in connection with the block for moving the same and for moving the carriage through the medium of the block.

10. In a glass-blowing machine, the combination of means for holding the molten glass, a mold in which the glass is blown, and a blow-plunger mounted to move between said parts whereby to take the glass from the said means and carry it to the mold.

11. The combination of a table, a glass-mold thereon, means for holding the molten glass, and a blow-plunger mounted to rotate over the table and also mounted to swing inward and outward in an arc between said means for carrying the molten glass and the mold.

HENRY BASTOW.

Witnesses:
   Wm. J. Porter,
   Charles Preston.